United States Patent

[11] 3,634,142

[72] Inventor Lloyd W. Eaton
 Cleveland, Ohio
[21] Appl. No. 13,286
[22] Filed Feb. 24, 1970
[45] Patented Jan. 11, 1972
[73] Assignee Clevite Corporation
 Cleveland, Ohio

[54] MAGNESIUM DRY BATTERY WITH ANODE CONTACT PROTECTION
 4 Claims, 2 Drawing Figs.

[52] U.S. Cl............................................... 136/111, 136/133
[51] Int. Cl....................................................H01m 21/00
[50] Field of Search............................................ 136/100, 111, 133, 120

[56] References Cited
 UNITED STATES PATENTS

| | | | |
|---|---|---|---|
| 2,229,431 | 1/1941 | Young........................... | 136/111.5 |
| 2,645,676 | 7/1953 | Emeriat......................... | 136/111.7 |
| 2,745,894 | 5/1956 | Nowotny....................... | 136/111 |
| 2,880,259 | 3/1959 | Nowotny....................... | 136/111 |
| 3,185,592 | 5/1965 | Kirk et al...................... | 136/100 M |
| 3,255,048 | 6/1966 | Comanor et al............... | 136/100 M |
| 3,390,016 | 6/1968 | Nelson.......................... | 136/100 M |
| 3,525,647 | 8/1970 | Strauss.......................... | 136/111 |

Primary Examiner—Winston A. Douglas
Assistant Examiner—C. F. Lefevour
Attorney—Darbo, Robertson & Vandenburgh ABSTRACT: The external, nonreacting surface of the magnesium anode of a dry cell is covered by a protective coating to prevent impairment or loss of electrical contact with the adjacent cell of a battery which, it has been discovered, frequently results from limited but effective chemical action that takes place at this exposed surface and proceeds under presumably sealing barriers to undermine electrical contact with the adjoining cell.

PATENTED JAN 11 1972  3,634,142

Inventor
Lloyd W. Eaton
By
Darbo, Robertson & Vandenburgh
Att'ys

MAGNESIUM DRY BATTERY WITH ANODE CONTACT PROTECTION

BACKGROUND AND SUMMARY OF THE INVENTION

Magnesium has long been used as the anode metal for dry cells. Its many advantages in this service have motivated and encouraged continuing efforts to overcome the variety of problems that accompany this use of magnesium due, in large part, to its great reactivity. By using appropriate electrolytes and inhibitors and by following special techniques in their manufacture, cells having cylindrical or flat magnesium anodes have been successfully manufactured in large quantities.

As a matter of convenience and manufacturing efficiency, as well as the difficulties involved in soldering to magnesium surfaces, battery intercell connections are advantageously made by means of a conductive thermoplastic material, such as the silver particle impregnated wax of Kurlandsky U.S. Pat. No. 2,666,803. This method of connecting the terminals of adjacent cells is especially useful in batteries consisting of stacks of flat cells; a small quantity of the conductive material placed between parts to be electrically connected which are normally pressed tightly together in the assembled battery serves the purpose.

The reliability of such batteries, especially after a period of storage, has been less than satisfactory. Many have been found to produce inadequate current, apparently the consequence of excessive resistance in the battery internal circuit, and frequently batteries are found to be entirely dead although never used. It was discovered in the course of a very thorough investigation, and subsequently confirmed, that the trouble resulted from the undermining of the intercell connections at the magnesium surfaces due to a corrosion of the exposed surfaces of the anodes which proceeded along under what had been assumed to be seals surrounding the contacts. Apparently, such corrosion resulted from the presence of moisture in the space between adjacent cells the presence of which is practically inevitable.

The object of this invention is to provide a method and means for preventing the disabling undermining of intercell connections between dry cells having magnesium anodes and thus greatly improve the reliability of magnesium cell batteries. More specifically, the object of the invention is to provide effective protection of the exposed surfaces of the magnesium anodes of the cells of a dry battery to prevent surface corrosion which, when carried far enough, impairs or destroys the electrical connection of the magnesium anode with the intercell connecting element.

These and other objects and advantages of the invention will become apparent from the following description and the accompanying drawing.

DESCRIPTION OF A PREFERRED EMBODIMENT

Figure 1:
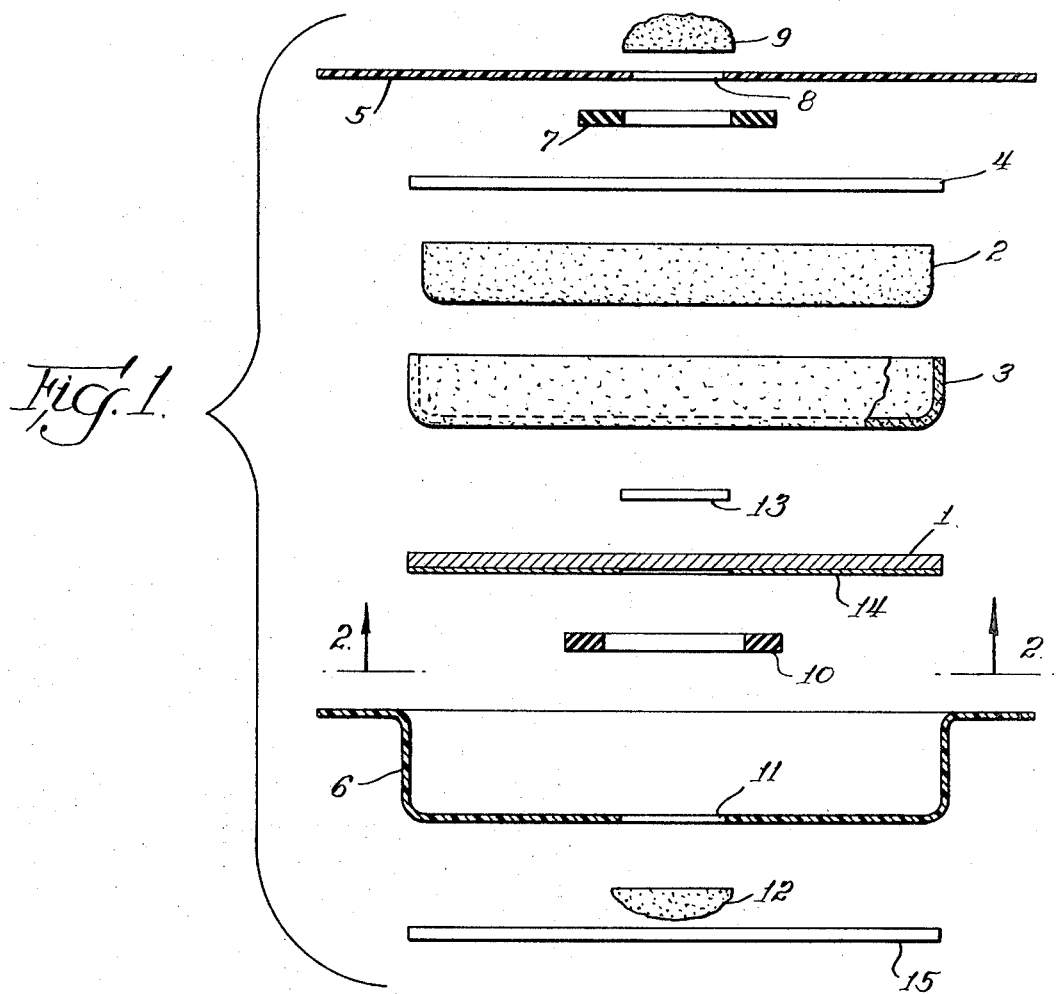
FIG. 1 is an exploded cross-sectional view of a single cell illustrating an exemplary embodiment of the invention.

The dry cell and the parts thereof, as illustrated in FIG. 1, are, with the single exception to be described below in detail, well known. The electrochemically active components include anode 1 and cathode 2, the latter comprising a mix of depolarizing and conductive materials and a suitable electrolyte, such as magnesium bromide solution, separated from each other by means of a bibulous separator 3. A conductive carbon current collector 4 engages the surface of cathode 2 and the cell is enclosed and sealed within a wrap composed of rubber hydrochloride films 5 and 6. A circular seal 7 of asphalt or hot melt adhesive resin serves to seal the current collector 4 to the enclosing film encircling a hole 8 provided in the film for the intercell connecting material 9. Similarly, a circular seal 10 serves to seal the anode to the film covering 6, surrounding hole 11 which is provided for access of the intercell connecting material 12 to the anode.

Advantageously, a disc 13 of inert and nonconductive material is adhered to the inner surface of anode 1 opposite the intercell contact area.

Figure 2:
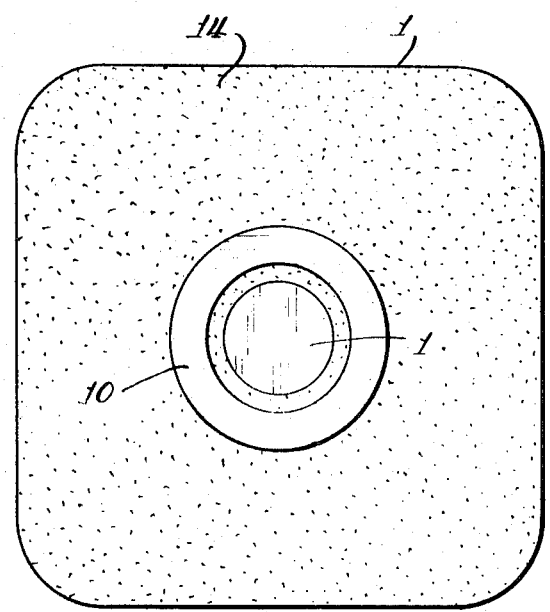
FIG. 2 is a view of the cell of FIG. 1 taken at the line 2—2 thereof and showing the magnesium anode with protective coating applied in accordance with the invention.

In accordance with the invention, a protective coating 14 is applied to one entire surface of the magnesium anode 1, excepting only the central portion which is left exposed for making intercell electrical contact. The coating comprises a Thin, dense layer of inert material which substantially excludes water molecules from penetrating to the covered surface of the magnesium anode. A suitable material for this purpose is an epoxy primer paint. A suitable material, specified by way of example, is that presently commercially known as Epoxy-Cote primer 15–404 with curing agent 15–014, manufactured by Speed-O-Laq Products Company, Inc. Other primer-type paints and hot melt adhesive materials have been found to be satisfactory. As is indicated in FIG. 1 and shown in FIG. 2, the protective coating extends inwardly under the seal 10 to approximately the area which is eventually covered by the intercell connecting material 12.

It has been found that use of the protective coating for the external surfaces of the magnesium anodes effectively prevents deterioration of the normally excellent electrical contact at the intercell connector-anode interface.

When the several component parts of the cell are brought together and sealed within the film enclosure, the cell is ready for use in building multicell batteries. The conductive wax or other intercell connecting materials fill the holes provided for access to the anode and current collector and electrically connect with the latter components. Advantageously, a metal foil moisture barrier 15 is interposed between adjacent cells. The blocks of cells may then be coated and/or inserted in containers and external terminals provided, all in known manner.

I claim:

1. In a dry cell comprised of flat cell elements including a magnesium anode and enclosed within a film wrapper having at least one hole therein exposing a limited contact area of the exterior surface of the anode and seal means for closing the cell hole in the wrapper, the improvement wherein the seal means comprises a coating on the anode covering all of area said exterior surface of said anode surrounding said contact area and a body of sealing material surrounding the hole in the wrapper and disposed between and adhering to said coating and said wrapper, said coating comprising a water impervious material which excludes water molecules from said exterior surface of said anode and extending under and beyond said body of sealing material whereby the seal is effected between said coating and said film wrapper.

2. Structure in accordance with claim 1 wherein said anode contact area and a hole in said wrapper are located centrally of said anode and the entire exterior surface of said anode except said contact area is covered by the water-impervious coating.

3. Structure in accordance with claim 1 and including an intercell connector comprising a body of electrically conductive thermoplastic material adherently engaging and covering said contact area and projecting through said hole in said wrapper.

4. In a dry cell comprised of flat cell elements including a magnesium anode and enclosed within a film wrapper having a hole therein exposing a limited contact area at the center of the external surface of the anode and seal means for closing the cell at the hole in the wrapper, the improvement wherein the seal means comprises a coating on the anode covering all of the exterior surface of the anode except the contact area thereof, said coating comprising an epoxy primer paint which is water impervious and excludes water molecules from said exterior surface of said anode, and a body of sealing material surrounding the hole in the wrapper between and adhering to said coating and the wrapper.

* * * * *

UNITED STATES PATENT OFFICE
CERTIFICATE OF CORRECTION

Patent No. 3,634,142            Dated January 11, 1972

Inventor(s) Lloyd W. Eaton

It is certified that error appears in the above-identified patent and that said Letters Patent are hereby corrected as shown below:

Col. 2, line 11      "Thin" should be - thin -.

Col. 2, line 43
(Claim 1)      Delete "area".

Signed and sealed this 31st day of October 1972.

(SEAL)
Attest:

EDWARD M. FLETCHER, JR.          ROBERT GOTTSCHALK
Attesting Officer                   Commissioner of Patents